S. G. NORTH.
SCREW HOLDER FOR SCREW DRIVERS.
APPLICATION FILED SEPT. 9, 1905.
914,174.
Patented Mar. 2, 1909.
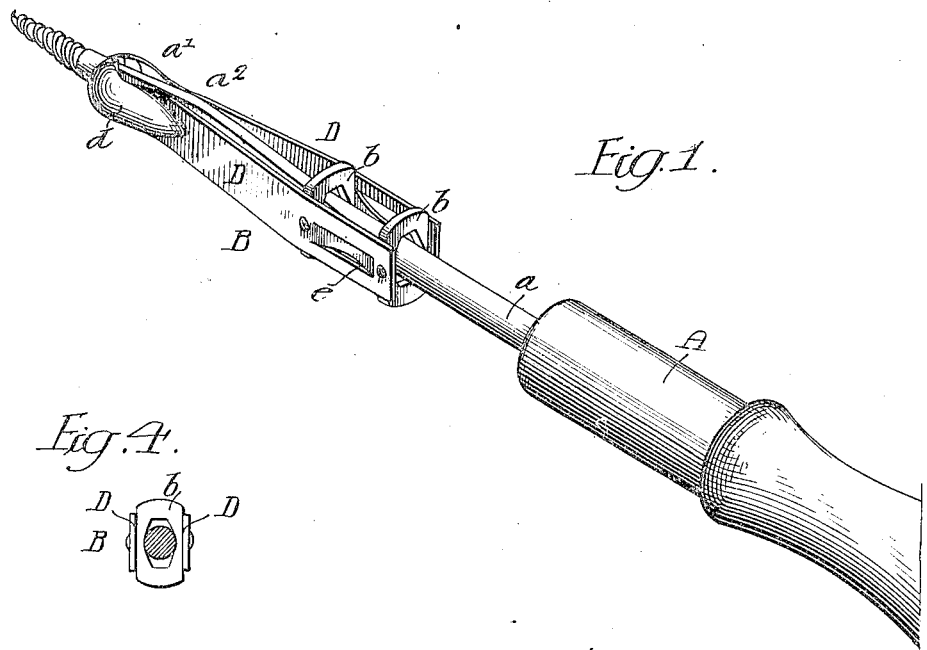
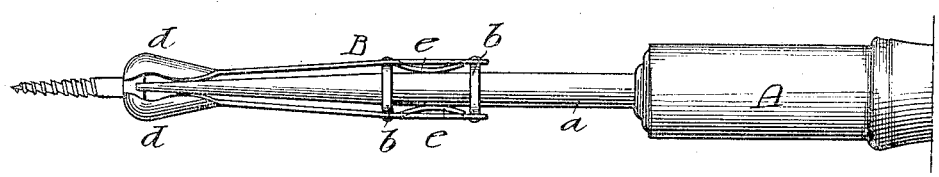
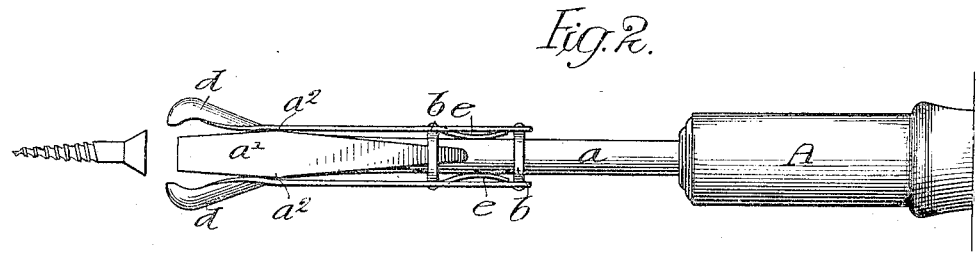
Witnesses:
Willy A. Burrowes
Titus H. Gros
Inventor
Selden G. North.
by his Attorneys.
Howard Howson

UNITED STATES PATENT OFFICE.

SELDEN G. NORTH, OF PHILADELPHIA, PENNSYLVANIA, ASSIGNOR TO NORTH BROTHERS MANUFACTURING COMPANY, A CORPORATION OF PENNSYLVANIA.

SCREW-HOLDER FOR SCREW-DRIVERS.

No. 914,174.　　　　Specification of Letters Patent.　　Patented March 2, 1909.

Application filed September 9, 1905.　Serial No. 277,677.

*To all whom it may concern:*

Be it known that I, SELDEN G. NORTH, a citizen of the United States, residing in Philadelphia, Pennsylvania, have invented certain Improvements in Screw-Holders for Screw-Drivers, of which the following is a specification.

The object of this invention is to make a simple and effective screw holder for screw drivers which can be sold independent of the screw driver, and which can be readily applied thereto and operated thereby. This object I attain in the following manner, reference being had to the accompanying drawing, in which—

Figure 1, is a perspective view showing my invention applied to a screw driver; Fig. 2, is a side view with the jaws forced open ready to receive a head of a screw; Fig. 3, is a view similar to Fig. 2, with the jaws closed upon the head of screw; and Fig. 4, is an end view of the holder.

A is a screw driver having a round shank $a$ and flattened end $a'$ forming shoulders $a^2$, $a^2$.

B is the screw holding attachment having in the present instance two plates $b$, $b$ forming a body portion, these plates are perforated for the passage of the shank of the screw driver. It will be noticed in referring to Fig. 4, that the perforations are of sufficient diameter to receive the shank so that it can be turned in the attachment, and there are notches at each side to allow for the passage of the flattened portion of the screw driver.

Secured to the two plates $b$, $b$ are spring jaws D, D having their ends $d$ beveled and rounded to fit the head of a screw. Bent from the spring jaws D, D between the plates $b$ $b$ are friction springs $e$, $e$ which bear against the shank of the screw driver and retain the holder in the position on the shank to which it is adjusted. Other means may be used for this purpose without departing from the main feature of this invention.

To use the device, it is first slipped onto the shank of the screw driver, as shown, and when in position the device is held and the screw driver turned so that the shoulders $a^2$ will force the spring jaws apart as in Fig. 2, the head of a screw is then inserted, the tip of the driver entering the slot in the head of the screw, after which the driver is turned, releasing the jaws so that they will close upon the head of the screw, as shown in Fig. 3, the screw can then be held and driven, after the screw has been driven a certain distance, the screw holder can be released by pulling the holder back or turning it on the screw driver, after which the screw can be driven home.

I claim as my invention:—

The combination of a screw driver having a round shank and a flattened end wider than the shank, of a screw holder consisting of plates having elongated openings so shaped as to engage the round shank and guide the device while permitting it to turn thereon, said openings being sufficiently elongated to allow the plates to pass over the end of the screw driver, and spring jaws carried by said plates, said jaws converging near their outer ends so that they engage the flattened end of the shank and then diverge and reconverge to receive and engage the head of the screw, substantially as described.

In testimony whereof, I have signed my name to this specification, in the presence of two subscribing witnesses.

SELDEN G. NORTH.

Witnesses:
　E. R. LOUGHERY,
　JOS. H. KLEIN.